United States Patent
Inoue

(10) Patent No.: US 8,991,357 B2
(45) Date of Patent: Mar. 31, 2015

(54) INTERNAL COMBUSTION ENGINE

(75) Inventor: Hiroaki Inoue, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 216 days.

(21) Appl. No.: 13/611,218

(22) Filed: Sep. 12, 2012

(65) Prior Publication Data

US 2013/0074801 A1 Mar. 28, 2013

(30) Foreign Application Priority Data

Sep. 27, 2011 (JP) .................. 2011-210898

(51) Int. Cl.
*F01L 1/26* (2006.01)
*F02B 17/00* (2006.01)
*F02D 41/30* (2006.01)
(Continued)

(52) U.S. Cl.
CPC ............... *F02B 17/00* (2013.01); *F02D 41/30* (2013.01); *F02B 19/14* (2013.01); *F02M 61/18* (2013.01); *F02F 3/26* (2013.01); *F02B 31/00* (2013.01); *F01L 1/00* (2013.01); *F02D 41/006* (2013.01); *F02D 41/3035* (2013.01); *F02D 13/0265* (2013.01); *F01L 13/0021* (2013.01); *F01L 13/0063* (2013.01); *F02D 41/3023* (2013.01); *F02D 2041/001* (2013.01); *F02D 2041/3052* (2013.01); *Y02T 10/47* (2013.01); *Y02T 10/18* (2013.01); *F01L 2001/0537* (2013.01); *F01L 2013/0073* (2013.01); *F01L 2800/06* (2013.01)
USPC ......... 123/298; 123/305; 123/346; 123/90.15

(58) Field of Classification Search
CPC ............... F01L 1/267; F01L 2800/06

USPC .......... 123/90.15–90.18, 294–305, 308, 432, 123/346
See application file for complete search history.

(56) References Cited

U.S. PATENT DOCUMENTS 4,974,566 A * 12/1990 LoRusso et al. ............... 123/308
5,301,636 A * 4/1994 Nakamura .................. 123/90.16
(Continued)

FOREIGN PATENT DOCUMENTS

CN 102061978 A 5/2011
DE 100 41 424 C2 4/2001
(Continued)

OTHER PUBLICATIONS

Office Action dated Apr. 11, 2013 issued in the corresponding German Patent Application No. 10 2012 217 095.2, filed Sep. 21, 2012 (with an English-language translation).
(Continued)

*Primary Examiner* — Erick Solis
(74) *Attorney, Agent, or Firm* — Rothwell, Figg, Ernst & Manbeck, P.C.

(57) ABSTRACT

There is provided efficient compression auto-ignition combustion over intermediate load range extended towards a low and high load range. An internal combustion engine enables compression auto-ignition combustion by securing a so-called sealed duration created by negative valve overlap. It includes a cylinder head, a cylinder, a piston in the cylinder having a top coupled to the cylinder head, a combustion chamber between an inner surface of a cylinder head and a top of the piston, and intake and exhaust valves. Two intake valves are arranged per each combustion chamber and made to differ in valve lift.

5 Claims, 14 Drawing Sheets

(51) Int. Cl.

| | | |
|---|---|---|
| *F02B 19/14* | (2006.01) | |
| *F02M 61/18* | (2006.01) | |
| *F02F 3/26* | (2006.01) | |
| *F02B 31/00* | (2006.01) | |
| *F01L 1/00* | (2006.01) | |
| *F02D 41/00* | (2006.01) | |
| *F02D 13/02* | (2006.01) | |
| *F01L 13/00* | (2006.01) | |
| *F01L 1/053* | (2006.01) | |

(56) References Cited

U.S. PATENT DOCUMENTS

| | | | | |
|---|---|---|---|---|
| 6,125,816 | A * | 10/2000 | Inoue | 123/299 |
| 6,267,097 | B1 | 7/2001 | Urushihara et al. | |
| 6,718,945 | B2 * | 4/2004 | Doria et al. | 123/432 |
| 6,732,710 | B2 * | 5/2004 | Borean et al. | 123/432 |
| 6,895,912 | B2 * | 5/2005 | Saruwatari et al. | 123/90.15 |
| 7,201,139 | B2 * | 4/2007 | Fuwa et al. | 123/306 |
| RE40,381 | E * | 6/2008 | Gianolio et al. | 123/90.12 |
| 8,655,572 | B2 * | 2/2014 | Iwai et al. | 701/104 |
| 2003/0111047 | A1 * | 6/2003 | Doria et al. | 123/432 |
| 2004/0000287 | A1 * | 1/2004 | Borean et al. | 123/432 |
| 2006/0090729 | A1 * | 5/2006 | Miyanoo et al. | 123/346 |
| 2006/0276954 | A1 * | 12/2006 | Muto et al. | 701/110 |
| 2007/0157901 | A1 * | 7/2007 | Caine et al. | 123/302 |
| 2008/0066713 | A1 * | 3/2008 | Megli et al. | 123/295 |
| 2008/0275621 | A1 | 11/2008 | Kobayashi | |
| 2010/0242902 | A1 * | 9/2010 | Kang et al. | 123/305 |
| 2011/0108001 | A1 | 5/2011 | Lee et al. | |
| 2012/0103304 | A1 * | 5/2012 | Kang et al. | 123/305 |

FOREIGN PATENT DOCUMENTS

| | | |
|---|---|---|
| DE | 102 36 623 A1 | 2/2004 |
| DE | 10 2007 001 301 A1 | 7/2007 |
| DE | 10 2010 036 774 A1 | 5/2011 |
| EP | 1 004 757 A1 | 5/2000 |
| EP | 1 388 665 A2 | 2/2004 |
| JP | 2001-3771 A | 1/2001 |
| JP | 2005-16347 A | 1/2005 |
| JP | 2006-144711 A | 6/2006 |
| JP | 2006-144714 A | 6/2006 |
| JP | 2006-233839 A | 9/2006 |
| JP | 4122630 B2 | 5/2008 |
| JP | 2009-156166 A | 7/2009 |

OTHER PUBLICATIONS

Notification of First Office Action mailed May 6, 2014 in corresponding CN Application No. 20120362358.X, filed Sep. 26, 2012 (with an English translation) (13 pages).

Office Action mailed Dec. 25, 2014 in corresponding Chinese Patent Application No. 201210362358.X (with an English translation) (7 pages).

* cited by examiner

INTERNAL COMBUSTION ENGINE

RELATED APPLICATION

The present application claims priority to Japanese Patent Application No. 2011-210898 filed on Sep. 27, 2011, the entire content of which is being incorporated herein by reference.

TECHNICAL FIELD

The present invention relates to internal combustion engines and more particularly to internal combustion engines capable of providing high quality compression auto-ignition combustion of fuel directly admitted to a combustion chamber by fuel injection.

BACKGROUND ART

There are known internal combustion engines using the spark ignition to initiate combustion of fuel/air mixture within each combustion chamber. There are known or proposed internal combustion engines enabling compression auto-ignition after compressing fuel/air mixture charge within each combustion chamber (see Patent Documents 1 to 3). In the internal combustion engines of the compression auto-ignition type, various kinds of ideas are made, including changes or modifications of the shape of each combustion chamber (see Patent Document 4) and changes or modifications of the intake and exhaust systems (see Patent Document 5).

The compression auto-ignition internal combustion engines may employ combustion after diluting the fresh charge with exhaust gas recirculation (EGR) by overlapping the intake and exhaust timings. In this case, there is a reduction in $CO_2$ emission as compared to the spark-ignition combustion.

The combustion temperature initiated by the compression auto-ignition is low. Thus, the compression auto-ignition combustion provides little nitrogen oxide ($NO_x$) emission. Therefore, the compression auto-ignition combustion is expected to make good contributions to a reduction in nitrogen oxide emission which reduction has been aimed at for combustion of diluted lean charge.

PRIOR ART DOCUMENT

Patent Document

Patent Document 1: JP patent application laid-open publication No. 2006-144711 (P2006-144711A)
Patent Document 2: JP patent application laid-open publication No. 2006-144714 (P2006-144714A)
Patent Document 3: JP patent application laid-open publication No. 2006-233839 (P2006-233839A)
Patent Document 4: JP patent application laid-open publication No. 2005-16347 (P2005-16347A)
Patent Document 5: JP patent No. 4122630 (P4122630)

SUMMARY OF THE INVENTION

Problem to be Solved

According to the description in the Patent Document 5 in particular, the compression auto-ignition combustion engine closes both of the intake and exhaust valves per cylinder at the same time near the exhaust top dead center of a piston to increase the quantity of residual gas (outgassing). In this case, the temperature of charge in the combustion chamber can be increased to the point for auto-ignition to enable auto-ignition combustion after accomplishing high temperature high pressure by compression of the charge during the subsequent compression stroke.

Sufficient temperature increase is not expected, however, when the compression auto-ignition internal combustion engine operates in low load range and may result in flame off due to failure to reach auto-ignition. When the engine operates in high load range, the engine may be damaged because the cylinder pressure (cylinder pressure peak) within the combustion chamber increases excessively due to denotation caused by auto-ignition at multiple points at the same time. In conclusion, the compression auto-ignition combustion is not expected to considerably reduce $CO_2$ and nitrogen oxide emissions because its operable range is limited and narrow.

Accordingly, an object of the present invention is to provide an internal combustion engine capable of providing efficient compression auto-ignition combustion while significantly extending its intermediate load range towards a low and high load range.

Solution to the Problem

According to a first aspect of the present invention, there is provided an internal combustion engine with a piston reciprocating in a cylinder and a combustion chamber defined between the top of the piston and an inner surface of a cylinder head portion of the cylinder. The internal combustion engine enables compression auto-ignition combustion over partial area of operating ranges. The internal combustion engine comprises: a fuel injector per the combustion chamber; at least one exhaust valve per the combustion chamber; at least one first intake valve and at least one second intake valve per the combustion chamber; and a mechanism configured to make adjustment that a valve lift of the first intake valve is greater than a valve lift of the second intake valve.

According to a second aspect of the present invention, in addition to the feature recited in the first aspect, the piston has a cavity formed inwardly from the top, the cavity provides a greater cavity volume on the side of the first intake valve and a less cavity volume on the side of the second intake valve, and the fuel injector sprays the fuel into the cavity.

According to a third aspect of the present invention, in addition to the feature recited in the first aspect, the fuel injector is configured to provide spray asymmetry in a manner to create within the combustion chamber an imbalance in spray mass distribution of fuel so that the fuel is sprayed more in volume towards the side of the first intake valve than towards the side of the second intake valve.

According to a fourth aspect of the present invention, in addition to the feature recited in the first aspect, the fuel injector provides spray holes, a number of the spray holes corresponding to the side of the first intake valve is larger than a number of the spray holes corresponding to the side of the second intake valve.

According to a fifth aspect of the present invention, in addition to the feature recited in the first aspect, the fuel injector has an imbalance distribution in injection hole angle, the injection hole angle for the side of the first intake valve side is larger than the injection hole angle for the side of the second intake valve side.

According to a sixth aspect of the present invention, in addition to the feature recited in the first aspect, the fuel injector performs a normal injection at a timing during the intake stroke, and then the fuel injector performs an additional injection at a timing during a second half of the compression stroke.

According to a seventh aspect of the present invention, in addition to the feature recited in the first aspect, the compression auto-ignition combustion occurs by securing a seal duration provided by closing the intake and exhaust valves at the same time between exhaust phase and intake phase.

Advantageous Effects of the Invention

According to the above-mentioned first aspect of the present invention, at least two intake valves per the combustion chamber are made to differ in valve lift so that there is an imbalance in inflow of intake air. This imbalance generates an intake air flow (swirl) within the combustion chamber to provide not a homogeneous charge but a stratified charge in the combustion chamber to provide a rich cloud within lean atmosphere. This ensures the auto-ignition at the rich cloud for the subsequent flame propagation without any flame off even when the engine operates within an area near the low load. This also ensures the slow combustion free from high temperature high pressure detonation by the controlled flame propagation in all directions from the auto-ignition at the rich cloud when the engine operates within an area near the high load. Accordingly, this extends the operating range to which the auto-ignition combustion is applicable by ensuring stable high quality auto-ignition over the wide or extended operating range.

According to the above-mentioned second aspect of the present invention, the cavity provides a greater cavity volume on the side of the first intake valve and a less cavity volume on the side of the second intake valve. As a result, it is possible to trap certainly the fuel which is sprayed from the fuel injector at a timing during the compression stroke. This causes more effective stratification of charge to provide high quality compression auto-ignition combustion.

According to the above-mentioned third to fifth aspects of the present invention, the fuel is sprayed in an appropriate manner to portions of the intake air flow according to the valve lifts of the intake valves (valve opening) by providing spray asymmetry in a manner to create within the combustion chamber an imbalance in spray mass distribution of fuel such as by an imbalance distribution in number of spray holes or an imbalance distribution in injection hole angle. This causes more effective stratification of charge to provide high quality compression auto-ignition combustion.

According to the above-mentioned sixth aspect of the present invention, the fuel injector performs a normal injection at a timing during the intake stroke, and then the fuel injector performs an additional injection at a timing during a second half of the compression stroke. Provision of an increased difference in fuel concentration in the stratified charge is ensured. This causes more effective stratification of charge to provide high quality compression auto-ignition combustion.

According to the above-mentioned seventh aspect of the present invention, diluting the charge with combusted gas derived due to outgassing is made possible, so-called internal EGR. This makes it possible to accomplish controlling $CO_2$ and nitrogen oxide ($NO_x$) emissions.

DESCRIPTION OF EMBODIMENT(S)

Figure 1:
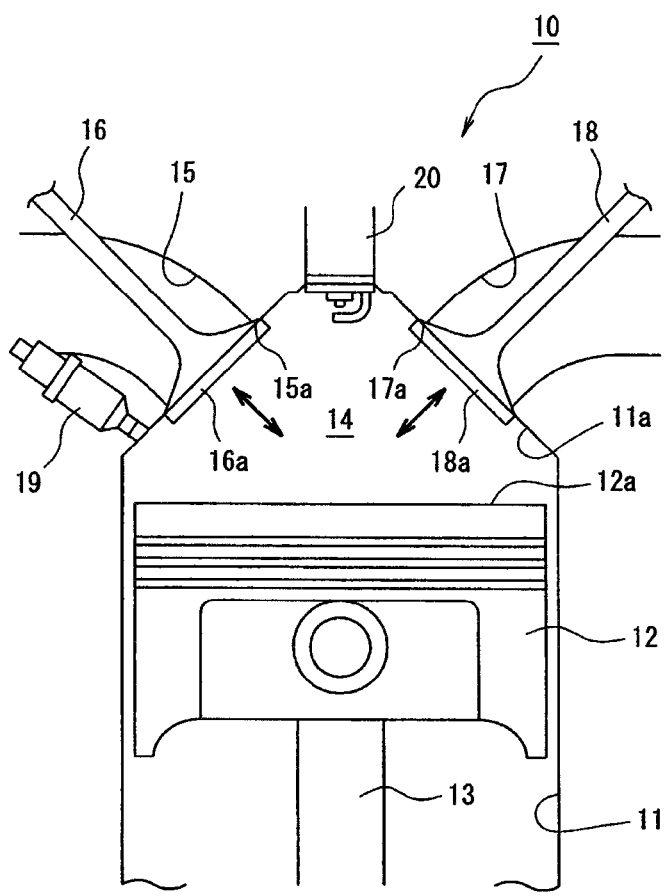
FIG. 1 is a schematic diagram of one embodiment of an internal combustion engine according to the present, in particular, an elevation seeing through the engine, illustrating the outline of whole construction of its basic structure.

Referring to the drawings, embodiments of the present invention are described in detail. FIGS. 1 to 14 are views illustrating one embodiment of an internal combustion engine according to the present invention.

With reference to FIG. 1, an internal combustion engine 10 is an engine installed in an automotive vehicle as a source of drive required to move the vehicle. The internal combustion engine 10 connects a piston 12 reciprocating in a cylinder 11 to a crankshaft, not illustrated, by a connecting rod 13 to transmit reciprocation of the piston 12 to the crankshaft after converting the reciprocation into rotation.

The internal combustion engine 10 includes a cylinder 11, a cylinder head for the cylinder 11 and a piston 12. The piston 12 in the cylinder 11 has a top 12a defining a combustion chamber 14 in cooperation with an inner surface 11a of the cylinder head for the cylinder 11. The combustion chamber 14 of the internal combustion engine 10 are communicable with intake side piping (intake passage, intake port) 15 on the intake side, i.e., on the left side viewing in FIG. 1, and exhaust side piping (exhaust passage, exhaust port) 17 on the discharge side, i.e., on the right side viewing in FIG. 1. Intake and exhaust valves 16 and 18 are mounted in the cylinder head and arranged to close the intake and exhaust side piping 15 and 17.

Fuel or gasoline F is provided to the internal combustion engine 10 by direct fuel injection into combustion chamber 14 from a fuel injector 19 (see FIG. 9) of a fuel injection system. The fuel injection is synchronized to reciprocation of the piston 12 and to open/close motions of intake and exhaust valves 16 and 18. The internal combustion engine 10 burns the fuel by combustion initiated by a spark produced by a spark plug 20 or combustion initiated by compression auto-ignition to generate power. The power generated by the combustion causes reciprocating motion of the piston 12 because it pushes the piston 12 down to the bottom of the cylinder 11 and the piston 12 is returned to the cylinder top by the power from the other pistons connected to the same crankshaft. The combustion chamber 14 of the internal combustion engine 10 experiences intake of atmosphere, compression and combustion of fuel/air mixture, expansion due to this combustion and exhaust of residual gas generated after combustion which are repeated in quick succession.

Furthermore, the internal combustion engine 10 comprises the intake side piping (intake port) 15 which has two openings 15a, 15b (not shown) and the exhaust side piping 17 (exhaust port) which has two openings 17a, 17b (not shown).

Figure 2:
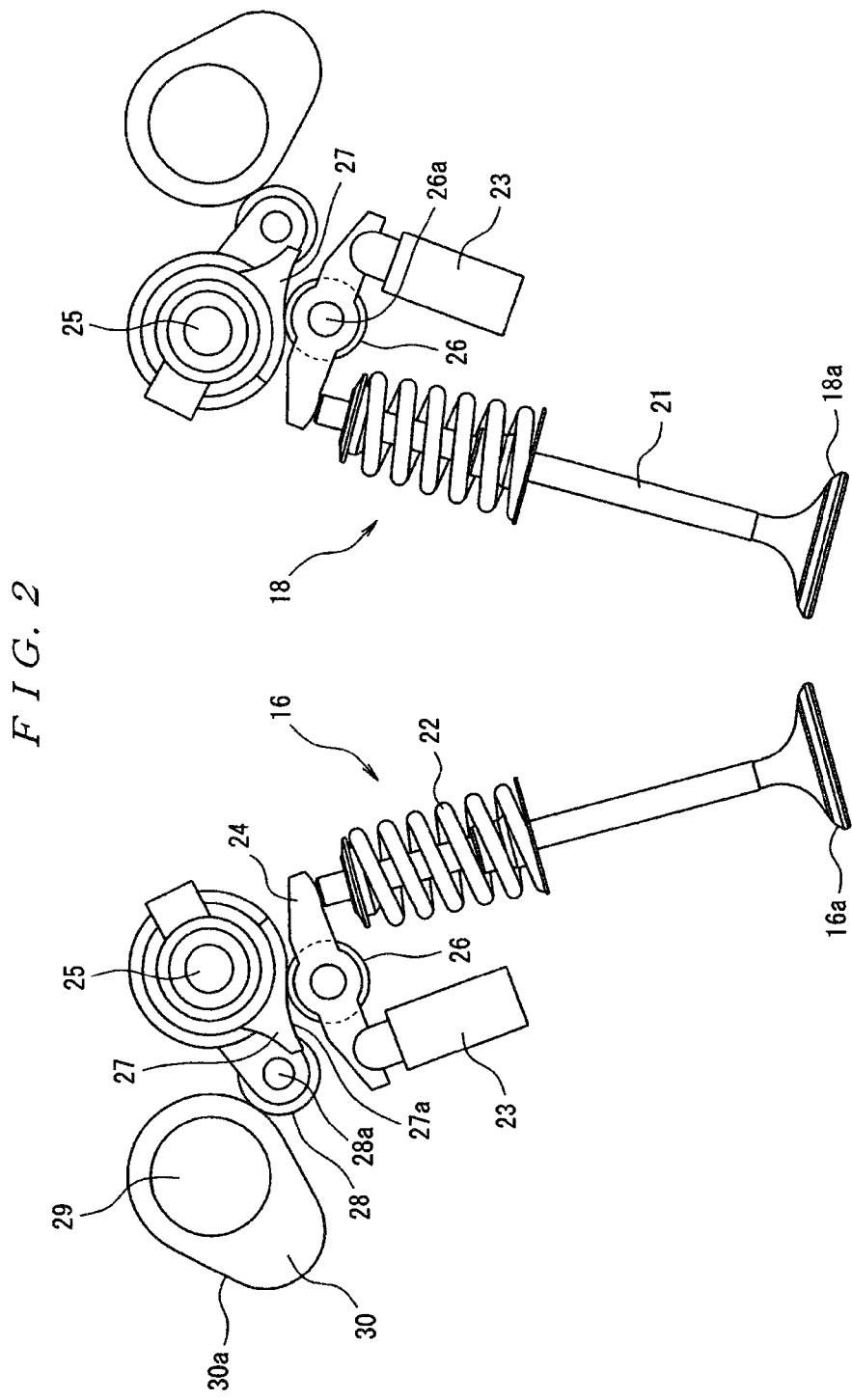
FIG. 2 is an elevation illustrating the layout of components of an intake valve and an exhaust valve of the engine.
Figure 3:
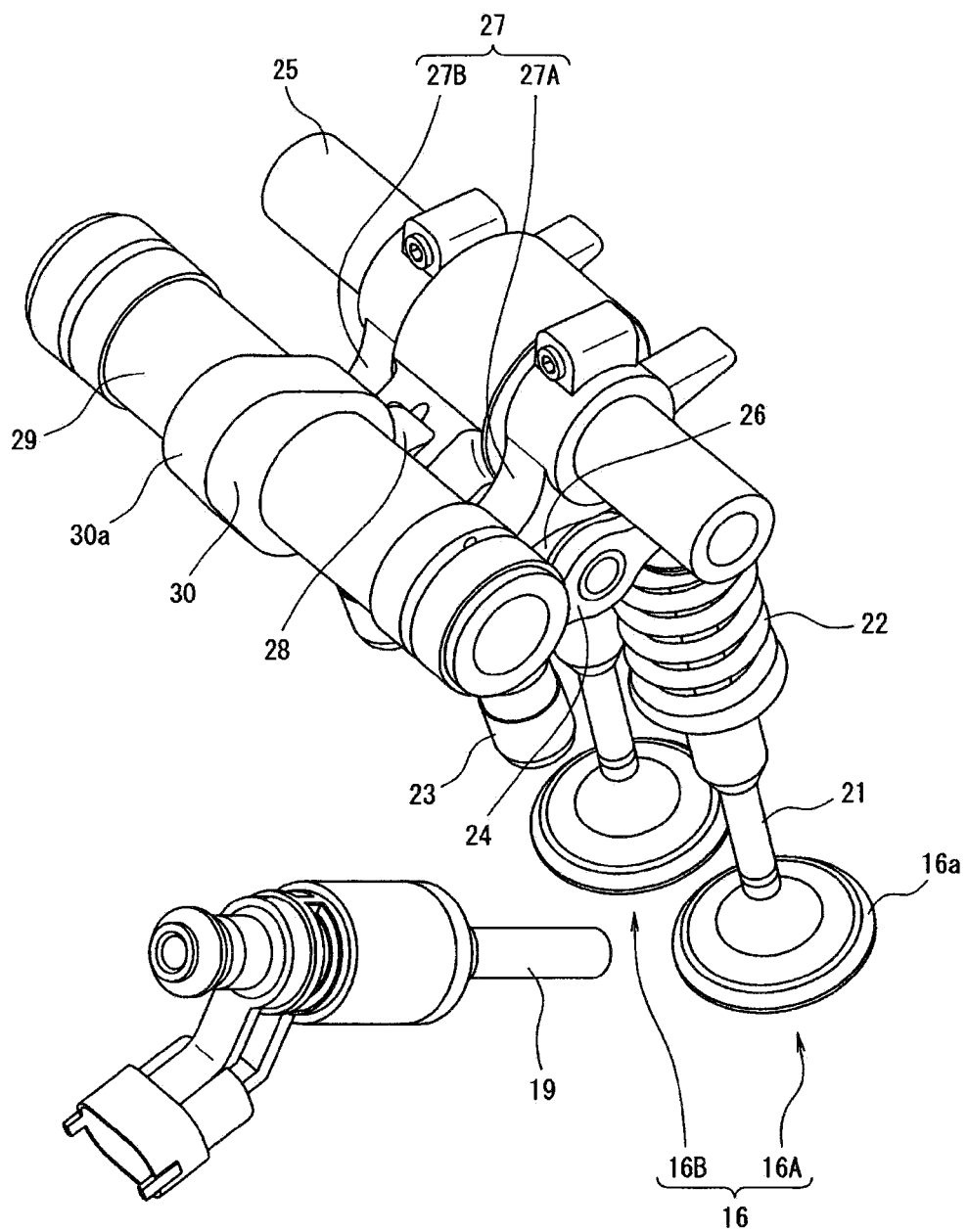
FIG. 3 is a perspective view illustrating the layout of components, including an injector, on the intake side of the engine.

In response to this, as shown in FIGS. 2 and 3, the intake valve 16 comprises the first intake valve 16A which opens and closes the opening 15a and the second intake valve 16B which opens and closes the opening 15b, and the first exhaust valve 18A which opens and closes the opening 17a and the second exhaust valve 18BA which opens and closes the opening 17b. (only the intake valves 16 being shown in FIG. 3). The intake and exhaust valves 16 and 18 allow the passage of intake air or exhaust gas through clearances formed when their valve heads 16a and 18a are lifted to their lifted state from the inner surface 11a of the cylinder head.

The intake and exhaust valves 16 and 18 include valve stems 21, springs 22, pivots 23, rocker arms 24, control shafts 25, rollers 26, restrictors 27, swinging rollers (or cam followers) 28, camshafts 29 and driver cams 30.

At their one or front ends, valve stems 21 have valve heads 16a and 18a. Springs 22 are arranged such that each of the springs 22 biases its associated valve stem 21 in a direction of pulling it up from the combustion chamber 14 (a direction of reducing valve lift). Pivots 23 are arranged such that each of them abuts on its associated rocker arm 24 at a point near its one end to support it in a manner to allow its pivotal movement.

At the opposite or rear ends, the valve stems 21 abut on the associated rocker arms 24 at points near the other ends thereof, respectively. At mid-points between their one and the other ends, the rocker arms 24 have their associated support pins 26a to carry their associated rollers 26 that turn on their associated support pins 26a. With their rollers 26 pressed against the associated restrictors 27, the rocker arms 24 are allowed to pivot on their associated pivots 23.

The control shaft 25 is fixedly installed for intake valves 16. The control shaft 25 supports each of the swinging rollers 28 and its associated restrictors 27 in a manner to allow a unitary movement of the swinging roller 28 and its associated restrictors 27. The control shaft 25 includes a shaft portion having an axis of rotation and an eccentric portion having an eccentric axis. For further information, reference is made to US Patent Application Publication No. US 2011/0107989 A1, which is herein incorporated by reference. The swinging roller 28 (see roller 36 in US 2011/0107989 A1) is supported by the eccentric portion (see eccentric portion 22 in US 2011/0107989 A1) for rotational movement about the eccentric axis (see eccentric axis 02 in US 2011/0107989 A1) The associated restrictors 27 (see rocking cam members 23A and 23B in US 2011/0107989 A1) are supported by the shaft portion (see shaft portion 20 and 21 in US 2011/0107989 A1) for rotational movement about the axis of rotation (see axis 01 in US 2011/0107989 A1) of the control shaft 25 (see control shaft 17 in US 2011/0107989 A1). When the control shaft 25 is held stationary, the unitary motion of the swinging roller 28 and the associated restrictors 27 is ensured by engagement of eccentric gears (see external gears 37A & 37B and internal gears 27A & 27B in US 2011/0107989 A1). However, moving the control shaft 25 about the axis of rotation to a new angular position causes the restrictors 27 to assume a new angular position relative to the swinging roller 28 (see the illustrated positions in FIG. 4A and FIG. 4B in US 2011/0107989) because of a change in the point of engagement of the eccentric gears. It is understood that the valve lifts of the intake valve 16A and 16B are varied by adjusting the angular position of each of the restrictors 27 relative to the swinging roller 28. The restrictors 27 restrict the valve lifts of the associated valve heads 16a or 18a by moving the press contact point of each of the restrictors 27 with one of the rollers 26 on the rocker arms 24.

The swinging roller (or cam follower) 28 is rotatably supported by a support shaft 28a distant from the axis of the control shaft 25 and biased by a bias element not illustrated in a rotational direction about the control shaft 25 toward the camshaft 29.

The camshaft 29 is driven so that the rotation of the camshaft 29 synchronizes the reciprocation of the piston 12 in the cylinder 11. The driver cam 30 is fastened to the camshaft 29. The driver cam 30 has a cam surface 30a with which the circumference surface of the swinging roller 28 is kept in press contact under the bias forcing the swinging roller 28 in the rotational direction about the control shaft 25 toward the camshaft 29.

This ensures normal operation of the intake and exhaust valves 16 and 18 because the driver cams 30 press the swinging rollers 28 as a result of the rotation of the driver cams 30 and the camshafts 29 in synchronous with the reciprocation of the piston 12 (the rotation of the crankshaft). In the intake and exhaust valves 16 and 18, keeping the rollers 26 in press contact with the restrictors 27 that move together with the associated swinging rollers 28 ensures pivotal movements of the rocker arms 24.

This enables the intake and exhaust valves 16 and 18 to press the valve stems 21 against the springs 22 (or move the valve stems 21 in their axial directions) following the movements of the rocker arms 24 on which the rear ends of the valve stems 21 abut.

As a result, the intake and exhaust valves 16 and 18 lift and separate the valve heads 16a and 18a at the front ends of the valve stems 21 from the openings 15a and 17a of the piping 15 and 17. The intake and exhaust valves 16 and 18 allow the valve stems 21 to move in their axial directions under the bias of the springs 22 until the valve heads 16a and 18a at their front ends tightly block the openings 15a and 17a of the piping 15 and 17.

The restrictors 27 of the intake and exhaust valves 16 and 18 are contiguous to the right and left sides of each of the swinging rollers 28 (as viewed in the axial direction of each of the control shafts 25). Each of the restrictors 27 includes a press contact surface 27a with which the roller 26 of one of the rocker arms 24 is pressed into contact. The profile of the press contact surface 27a of the restrictor 27 is such that the radial distance from the axis of the control shaft 25 varies with different positions taken by the restrictor 27 after angular positioning the restrictor 27 and it varies with different angular positions taken by the swinging roller 28.

Figure 4:
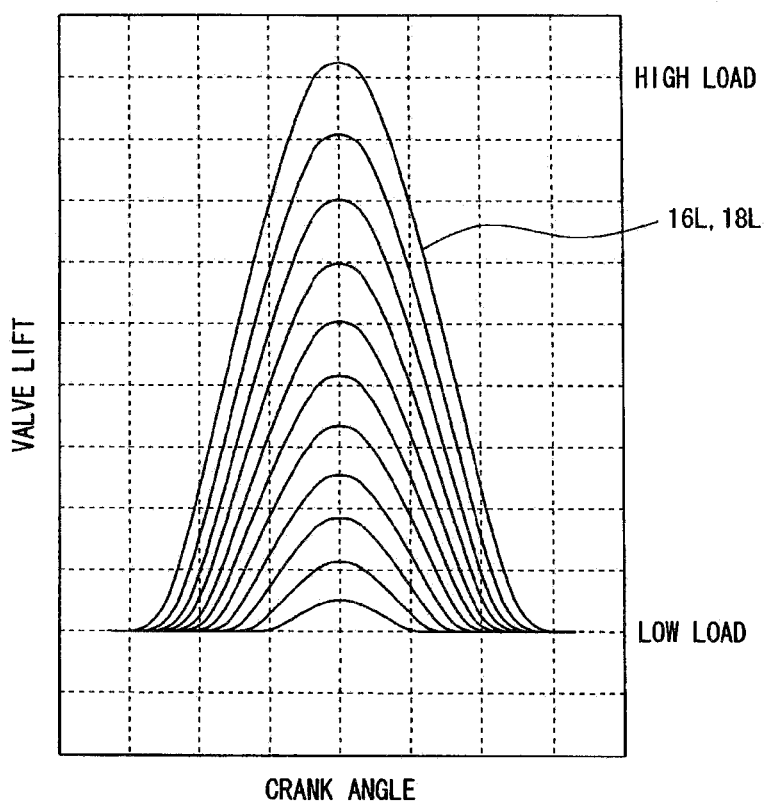
FIG. 4 is a graph describing the valve lift versus crank angle.

The restrictor 27 can adjust the amount of pivotal movement of the associated rocker arm 24 to provide valve lift as shown in FIG. 4 by moving the point of press contact of the press contact surface 27a with the roller 26 of the rocker arm 24 (angular positioning the restrictor 27 relative to the swinging roller 28). This restrictor 27 can alter valve lifts 16L and 18L of the valve heads 16a and 18a at the front ends of the valve stems 21 in conjunction with different levels from low load to high load and vice versa according to, for example, the manipulation of an accelerator pedal (the position of a throttle valve) for acceleration or deceleration.

There is provided an injector 19 between two intake valves 16 mounted per each cylinder or combustion chamber 14. Synchronizing the injection timing to the reciprocation of the piston 12 (crankshaft angle), the injector 19 sprays fuel F within the combustion chamber 14 at any timing during lift action that intake valve 16 opens and closes the opening 15a of the intake side piping 15.

The internal combustion engine 10 is configured to adjust the timing of the intake valve opening and closing (duration) when the intake valves 16 uncover the openings 15a of the intake side piping 15 in a direction toward or away from the timing of the exhaust valve opening and closing when the exhaust valves 18 uncover the openings 17a of the exhaust side piping 17.

For the combustion of the fuel F sprayed within the combustion chamber 14 initiated by spark ignition by the spark plug 20, the rotational relation of the camshaft 29 (driver cam 30) to its drive is adjusted so that the timing of intake valve opening and closing and the timing of exhaust valve opening and closing occur at the same time during a short period of time (so-called "Valve Overlap").

Figure 5:
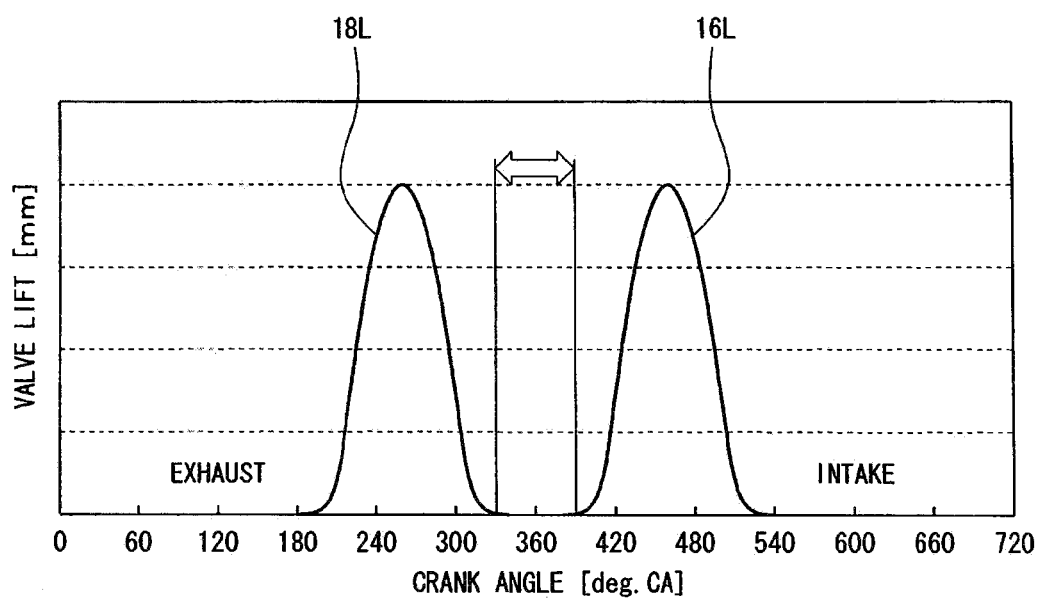
FIG. 5 is a graph describing the intake and exhaust timings versus crank angle.

Meanwhile, for the combustion of the fuel F sprayed within the combustion chamber 14 initiated by the compression auto-ignition (called hereinafter "auto-ignition"), the rotational relation of the camshaft 29 (driver cam 30) to its drive is adjusted so that the timing of intake valve opening and closing and the timing of exhaust valve opening and closing do not occur at the same time to provide a sealed duration as indicated by a double-headed arrow in FIG. 5 (so-called "Minus Valve Overlap").

This means that, with the timing of exhaust valve opening and closing and the timing of intake valve opening and closing being separated from each other, the auto-ignition combustion uses internal EGR in which the combusted internal gas due to outgassing in a closed space during the sealed duration from the wall surface of the combustion chamber 14 is mixed with the fresh charge to initiate combustion.

Figure 6:
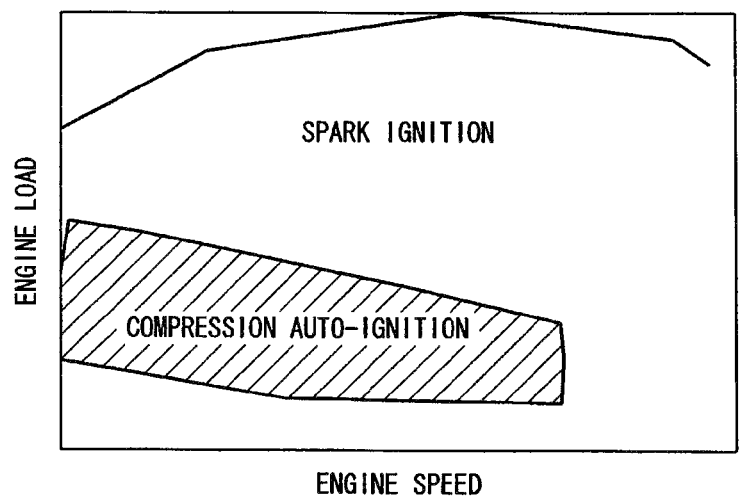
FIG. 6 is a graph describing the combustion type (auto-ignition combustion or spark-ignition combustion) selectable depending on operating range.

Spark-ignition combustion control using a spark produced by the spark plug 20 ensures stable combustion in the internal combustion engine 10 when the engine load against varying driving conditions with different engine speeds falls in one of a low and high load range shown in FIG. 6.

Meanwhile, when the engine load falls in an intermediate load range, which is most frequently used during driving, auto-ignition combustion control eliminates the use of the spark plug 20 for energy saving. In order to let the fuel F flow within the combustion chamber 14 in the most appropriate manner for auto-ignition combustion when the engine load falls in the intermediate load range, various kinds of ideas are made.

Specifically, two intake valves 16A and 16B shown in FIG. 3 are arranged with the spark plug 20 that is exposed to the combustion chamber 14 at a cup-shaped part of its upper surface 11a (the inner surface of the head of the cylinder 11) between them, opposite to the exhaust valves 18, respectively, and in a line parallel to a line in which the exhaust valves 18 are arranged. These intake valves 16A and 16B are operable so that they differ in the amount of a valve lift of each of the valve heads 16a from the upper surface 11a of the combustion chamber 14.

Figure 7:
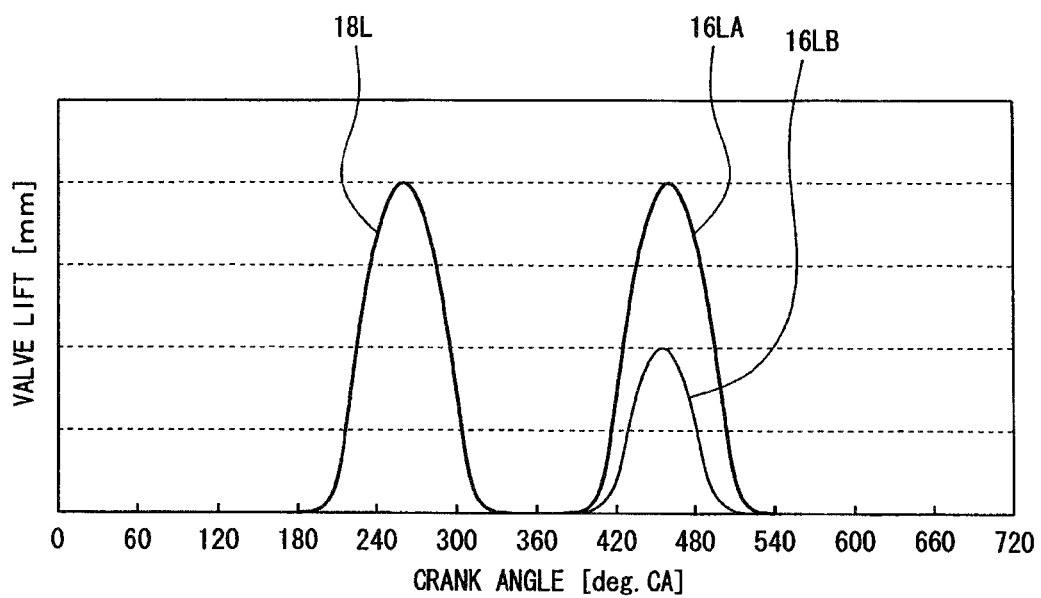
FIG. 7 is a graph describing the valve lifts of intake valves at intake timing for auto-ignition combustion.

According to the present embodiment shown in FIG. 7, the intake valve 16A (first intake valve), which is on the right when one is facing the top 12a of the piston 12 from the intake side, provides a valve lift 16LA as high as a valve lift 18L of the exhaust valves 18. In contrast, the intake valve 16B (second intake valve), which is on the left when one is facing the top 12a of the piston 12 from the intake side, provides a valve lift 16LB that may be adjustable to about half the valve lift 16LA of the intake valve 16A.

Therefore, in order to press the intake valves 16A and 16B, the restrictors 27A and 27B, which are contiguous to the right and left of the associated swinging roller 28, pivot at the rate of pressing the swinging roller 28 to pivot. Each of the press contact surfaces 27a, with which the restrictors 27A and 27B are formed, includes a surface portion extending around and having the same radial distance to the axis of rotation of the control shaft 25 even if, as described later, the contact point of the restrictor 27A or 27B with the roller 26 is shifted in order to displace the valve lift of the intake valve 16A or 16B between, as shown in FIG. 4, the maximum amount of valve lift and the minimum amount of valve lift.

The press contact surfaces 27a of the restrictors 27A and 27B have such profiles that, with the restrictors 27A and 27B held at angular positions after having been shifted in a rotational direction about the control shaft 25, the intake valve 16B will provide valve lift 16LB half the amount of valve lift 16LA of the intake valve 16A.

Figure 8:
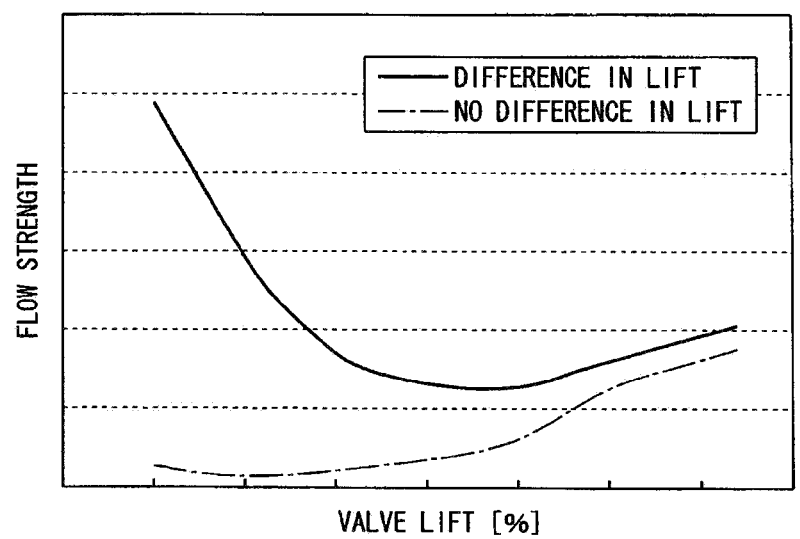
FIG. 8 is a graph describing the effect derived from the valve lift control illustrated in FIG. 7.

As shown in FIG. 8, providing a difference in valve lift between the intake valves 16A and 16B makes it possible to adjustably regulate the strength of air movement of intake air admitted to the combustion chamber 14.

If there is no difference in valve lift between them, both of the intake valves 16A and 16B allow admission of equal amounts of intake air over duration ranging from the timing when the valve lifts are small so that the valve heads 16a and the corresponding openings 15a of the intake side piping 15 provide minute clearances to the timing when the valve lifts are maximum. As shown by the one-dot chain line in FIG. 8, this causes only some increase in intake air movement within the combustion chamber 14 by increasing the amount of combustion air as the amount of intake air (valve opening) gradually increases.

Whereas, when the valve lifts 16LA and 16LB of the intake valves 16A and 16B differ, the clearance between one of the valve heads 16a and the associated one of the openings 15a of the intake side piping 15 and the clearance between the other valve head 16a and the other opening 15a of the intake side piping 15 differ in valve opening from the timing when the valve lifts are small so that the valve heads 16a and the corresponding openings 15a of the intake side piping 15 provide minute clearances. As shown by the fully drawn line in FIG. 8, this causes the intake valve 16A to admit intake air to the combustion chamber 14 in greater volume than the other intake valve 16B does from the beginning of induction phase, and causes the intake valves 16A and 16B to differ in induction flow rate (flow velocity) of atmosphere admitted to the combustion chamber 14 through the minute clearances at the beginning of induction phase.

In conclusion, there are produced within the combustion chamber 14 a strong flow from the beginning of induction phase and a rotation of intake air called a swirl S (see FIG. 11) in a direction from the intake valve 16A toward the intake valve 16B because the valve lifts 16LA and 16LB of the two intake valves 16A and 16B per each cylinder differ.

Figure 9:
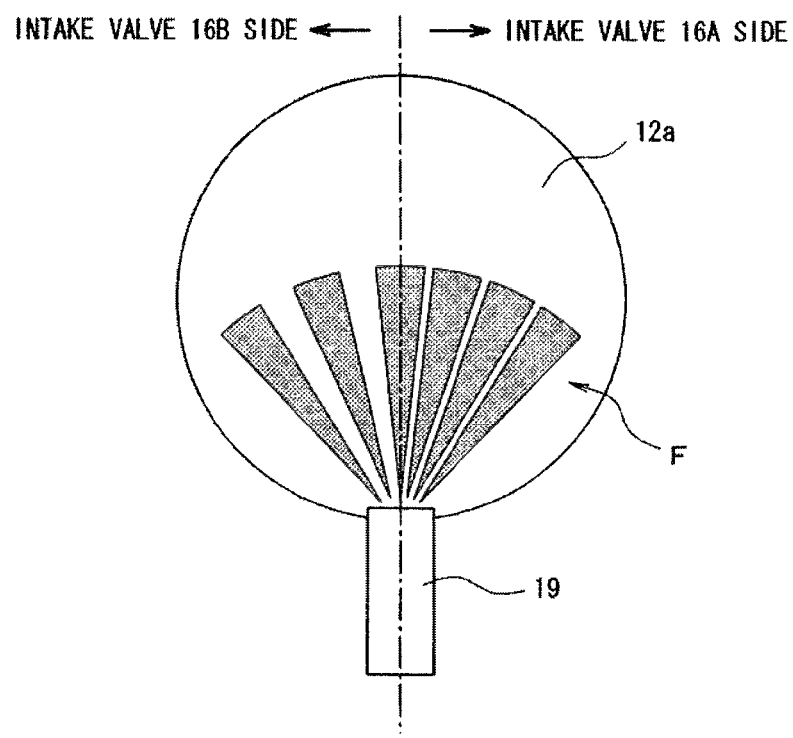
FIG. 9 is a plan view describing an imbalance in spray mass distribution of fuel for auto-ignition combustion.

The injector 19 is a multi-hole injector having at least three spray holes. This injector 19 provides spray asymmetry in a manner to create within the combustion chamber 14 an imbalance in spray mass distribution of fuel F (a difference between regions in spray pattern) adjusted to the valve lifts 16LA and 16LB of the intake valves 16A and 16B (volumes of intake air). As shown in FIG. 9, the injector 19 is set so that more number of spray holes is oriented towards one of the regions on the intake valve 16A side of the combustion chamber 14 than number of spray hole(s) oriented towards the other region on the intake valve 16B side of the combustion chamber 14.

This enables fuel F emerging from the spray holes provided at the tip of the injector 19 to be carried by swirl S of intake air for flow and diffusion of the fuel F within the combustion chamber 14. Number of spray holes at the tip of the injector 19 may be determined in accordance with the diffusion state.

Figure 10:
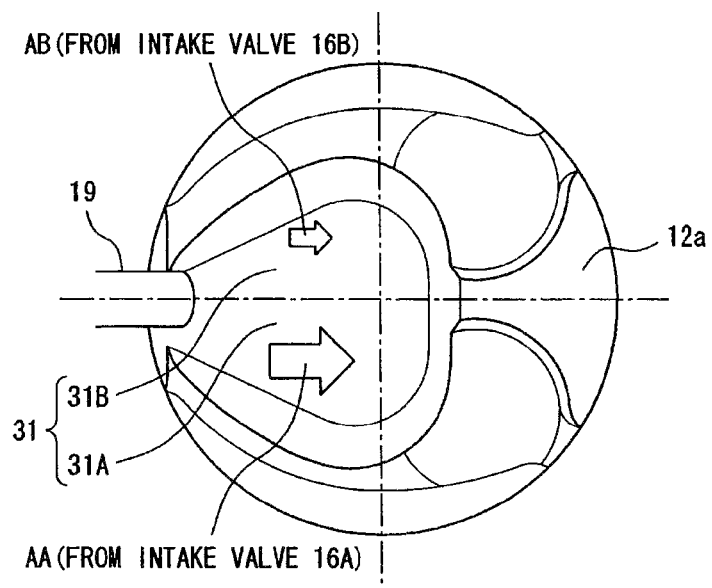
FIG. 10 is a plan view illustrating the suitable configuration of a top of a piston for auto-ignition combustion.

As shown in FIG. 10, the piston 12 is formed with a cavity (or depression) 31 in the top 12a which cooperates with the inner surface 11a of the head of the cylinder 11 to define the combustion chamber 14. The cavity 31 has an imbalance in cavity depth (cavity volume) distribution adjusted to the quantities of intake air as indicated by the sizes of arrows AA and AB in FIG. 10 caused due to the lifts 16LA and 16LB of the intake valves 16A and 16B and the injected quantity of fuel F emerging from the injector 19. Concretely, the cavity 31 provides a greater cavity volume of the cavity portion 31A on the side of the first intake valve 16A and a less cavity volume of the cavity portion 31B on the side of the second intake valve 16B. Therefore, it is possible to receive relatively great amount of fuel injected into the side of the intake valve 16A by the greater cavity volume.

For this reason, it is possible that all of the fuel/air mixture which is formed by mixing fuel injected and intake air flows in accordance with the form of the cavity 31. Then, it is possible that all of the fuel/air mixture is formed reveres tumble.

Figure 11:
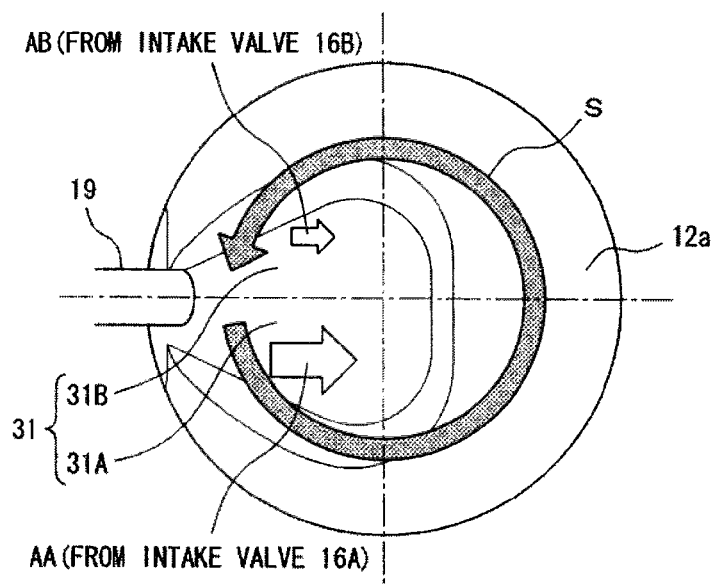
FIG. 11 is a plan view describing the effect derived from the piston top configuration illustrated in FIG. 10.

In detail, the quantity and flow rate of intake air AA upon entering the combustion chamber 14 in accordance with the lift 16LA of the intake valve 16A are greater than those of intake air AB upon entering the combustion chamber 14 in accordance with the lift 16LB of the intake valve 16B as mentioned before. Formed inward from the top 12a of the piston 12 is a peripheral face, which is significantly curved, of the cavity portion 31A on the intake valve 16A side larger in volume than the cavity portion 31B on the intake valve 16B side. This generates horizontal cylinder swirl rotating in a direction along the cylinder inner circumferential surface around the cylinder axis, a so-called swirl S, within the combustion chamber 14 as shown in FIG. 11. The swirl S carries fuel also, which is emerged from the injector 19, for flow and diffusion of the fuel.

Figure 12:
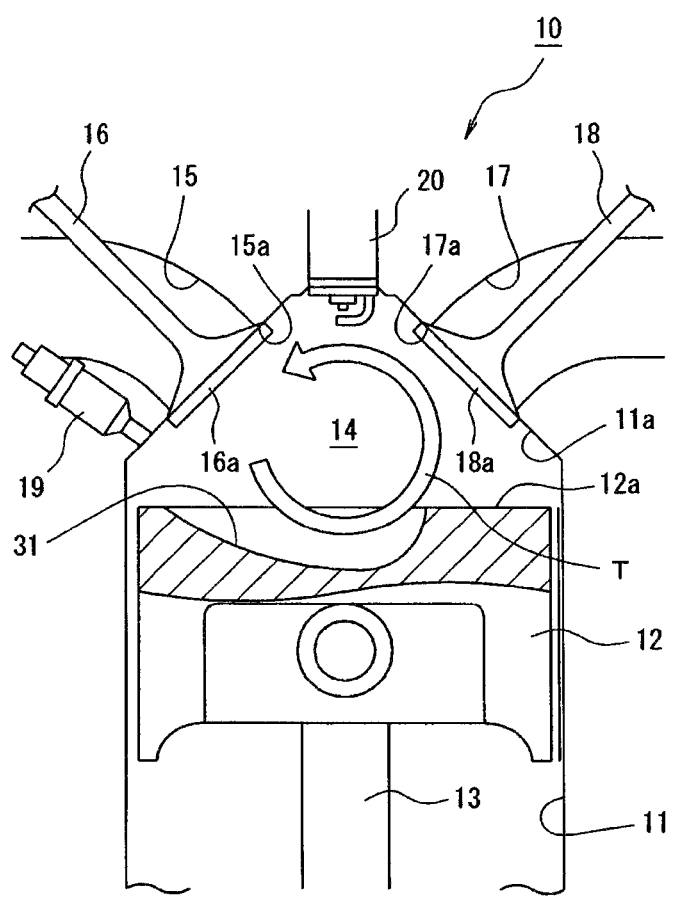
FIG. 12 is a fragmentary sectioned elevation seeing through the engine, illustrating the effect derived from the piston top configuration illustrated in FIG. 10.

The cavity 31 formed inward from the top 12a of the piston 12 has the bottom, which is significantly curved, of the cavity portion 31A on the intake valve 16A side larger in volume than the cavity portion 31B on the intake valve 16B side. This generates vertical cylinder swirl along the bottom in a direction towards the inner surface 11a of the cylinder head, a so-called reverse tumble T, within the combustion chamber 14 as shown in FIG. 12. The tumble T carries fuel also, which is emerged from the injector 19, for flow and diffusion of the fuel.

This generates, within the combustion chamber 14, intake air flow forms combining the swirl S and the reverse tumble T. In other words, this produces, within the combustion chamber 14, a flow motion emerged from the neighborhood of the top 12a of the piston 12, rotating in a direction along the cylinder inner circumferential surface and curling up towards the location of a roof of the combustion chamber 14 (the inner surface 11a of the head of the cylinder 11) which the electrode of the spark plug 20 is positioned on enter of the combustion chamber 14. This causes the flow of fuel/air mixture which is formed by mixing fuel injected and intake air to travel towards the location (center of the combustion chamber 14) of the spark plug 20 on the roof 11a of the combustion chamber 14. As a result, it is possible that the concentration of the fuel F near the spark plug 20 becomes great. It is possible that the concentration of the mixture becomes gradually lean from the center of the combustion chamber 14 to outer portion of the combustion chamber 14. Then, the concentration of the mixture is stratified.

Therefore, increasing density of fuel F in the neighborhood of the spark plug 20 to initiate and propagate combustion is effective also when the internal combustion engine 10 lets a spark produced by the spark plug 20 initiate combustion event to burn the injected fuel F within the combustion chamber 14. In addition, the internal combustion engine 10 is controlled so that combustion occurs at the center of the upper portion of the combustion chamber 14 where density of fuel F is increased and widely propagates in all directions when the charge within the combustion chamber 14 is compressed to the high temperature and high pressure point of auto-ignition to burn the injected fuel F during running in the intermediate load range, which is most frequently used during driving as shown in FIG. 6.

Figure 13:
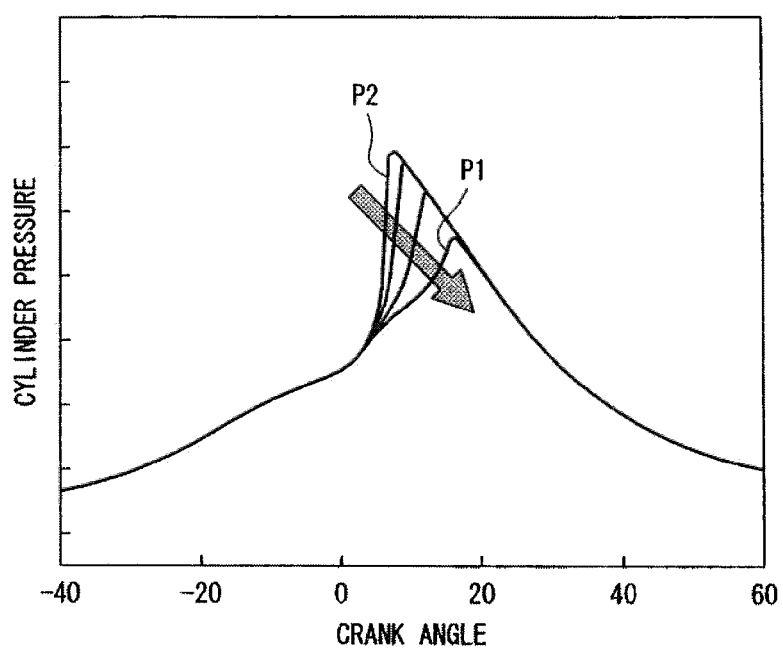
FIG. 13 is a graph illustrating the effect derived from auto-ignition combustion.
Figure 14:
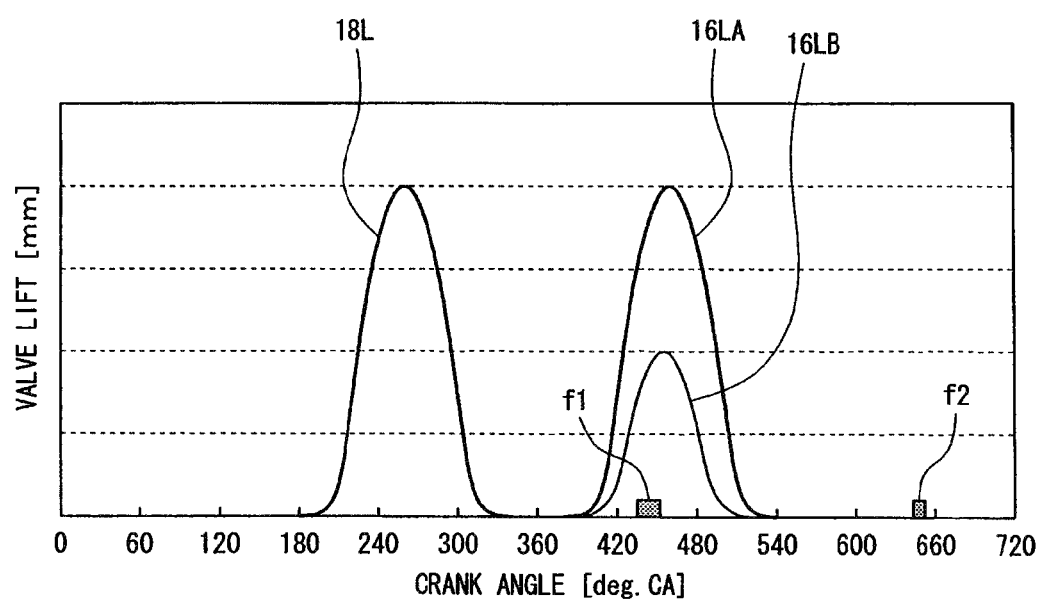
FIG. 14 is a graph illustrating the timings of fuel injections for auto-ignition combustion.

As shown in FIG. 13, the conventional auto-ignition combustion increases the peak cylinder pressure P2 to make the maximum because the auto-ignition occurs at multiple points at a time to cause propagation of flame from the multiple points which makes the injected fuel within the combustion chamber to burn very quickly.

Meanwhile, according to the present embodiment, the injected fuel F and air mixture within the combustion chamber 14 is stratified to attain a fuel density distribution centering on the neighborhood of the spark plug 20. This causes auto-ignition to occur at the center of the distribution and propagation of flame in all directions away from this center which makes the injected fuel F to burn slowly without any occurrence of flame fronts at a plurality of points. This blunts an increase of the peak cylinder pressure P1. This makes the peak cylinder pressure P1 to stay lower than the peak cylinder pressure P2.

The instability of combustion in the engine may take place upon or after a shift from the low or high load range for the spark-ignition combustion using the spark plug 20 to the adjacent low or high load side of the intermediate load range for the auto-ignition combustion. This combustion instability is improved according to the present embodiment by providing a small quantity of fuel by an additional injection f2 at a timing during a second half of the compression and combustion stroke in addition to a normal quantity of fuel by a normal injection f1 at a timing during the preceding intake phase of the same cycle by the intake valves 16 to increase the density of fuel F within the combustion chamber 14 to make the auto-ignition easy to occur.

This additional injection f2 is not necessarily required and may be installed as an optional setting when required in view of the engine combustion characteristic. Needless to say, providing fuel F for the engine by the additional injection f2 may be carried out not only over the low or high load side of the intermediate load range which is adjacent to one of the low load range and the high load range, but over the whole of the intermediate load range.

According to the present embodiment, admitting intake air after making the valve lifts of the two intake valves 16A and 16B per each cylinder to differ produce within the combustion chamber 14 a horizontal swirl S (within a plane in which the axes of the two intake valves 16 lie). Besides, forming within the top 12a of the piston 12 with the cavity portions 31A and 31B having an imbalance in cavity volume distribution adjusted to the quantities of the admitted intake air produces within the combustion chamber 14 a vertical reverse tumble T. Enabling the injected fuel F to be carried by the flow combining swirl S with tumble T for its mass flow and diffusion by making the fuel injector 19 to provide spray asymmetry in a manner to create an imbalance in spray mass distribution of fuel does not provide homogeneous charge within the combustion chamber, but provides stratified charge within the combustion chamber 14 including a rich cloud in the neighborhood of the center to make the auto-ignition easy to occur. This ensures the auto-ignition at the rich cloud for the subsequent flame propagation without any flame off even when the engine operates within an area near the low load. This also ensures the slow combustion free from high temperature high pressure detonation by the controlled flame propagation in all directions from the auto-ignition at the rich cloud when the engine operates within an area near the high load. Accordingly, this extends the operating range to which the auto-ignition combustion is applicable by ensuring stable high quality auto-ignition over the wide or extended operating range.

Figure 15:
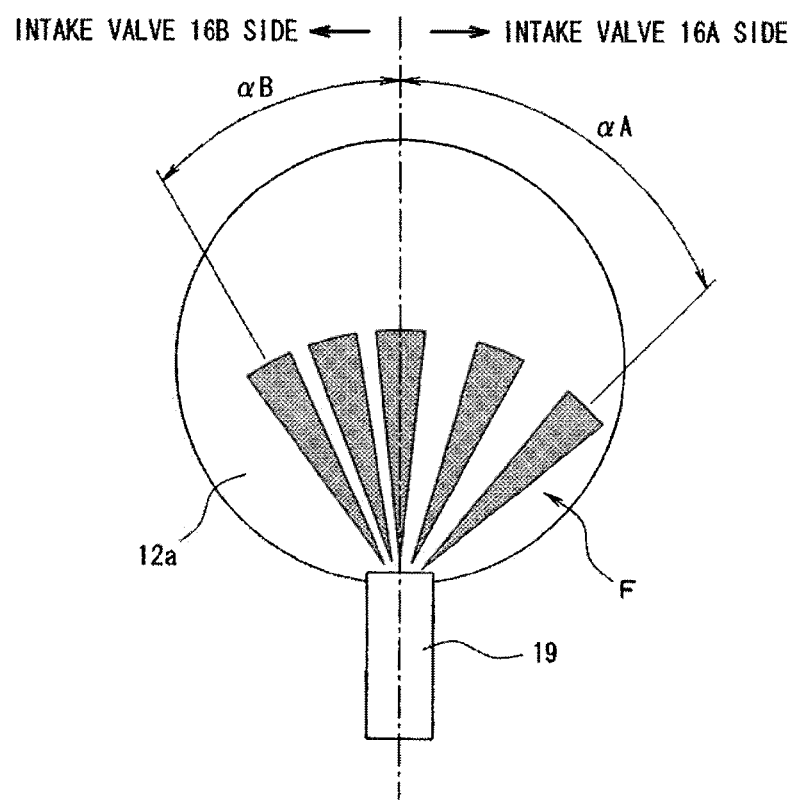
FIG. 15 is a plan view illustrating another approach to an imbalance in spray mass distribution of fuel for auto-ignition combustion.

According to another aspect of the present embodiment, it is possible to providing a setting that an injector 19 provides spray asymmetry as shown in FIG. 15 in a manner to create an imbalance in injection hole angle α distribution adjusted to the valve lifts 16LA and 16LB of the intake valves 16A and 16B (volumes of intake air). Concretely, assuming a center line illustrated by the one-dot chain line in FIG. 15 between one of the two regions on the intake valve 16A side and the other region on the intake valve 16B side, an injection hole angle αA for the intake valve 16A side and a different injection hole angle αB for the intake valve 16B side may be set. If this is the case, an imbalance in spray mass distribution of fuel F admitted by the fuel injector 19 within the combustion chamber 14 may be set. This enables the injected fuel F to be carried by swirl S and reverse tumble T of intake air within the combustion chamber 14 by orienting more volume of the fuel towards the intake valve 16A side than the volume of the fuel towards the intake valve 16B side, and by using the cavity which is formed on the top of the piston corresponding to the different of the spray mass.

The present invention is deemed to encompass all of embodiments which provide equivalent effect derived from the object of the present invention and not limited to the illustrated embodiment. The scope of the present invention is defined by various combinations and modifications of the features derived from the teachings of the present disclosure and not limited to combinations of the features recited in the claims.

INDUSTRIAL APPLICABILITY

While the embodiment has been described, the present invention is not limited to the illustrated embodiment. Rather, it is understood that various changes may be made without departing from the spirit and scope of the invention.

REFERENCE NUMERALS LIST

10 Internal combustion engine
11 Cylinder
12 Piston
12a Top
14 Combustion chamber
15 Intake side piping
16, 16A, 16B Intake valve
16L, 16LA, 16LB, 18L Valve lift
17 Exhaust side piping
18 Exhaust valve
19 Fuel injector
20 Spark plug
24 Rocker arm
25 Control shaft
26 Roller
27, 27A, 27B Restrictor
27a Press contact surface
28 Swinging roller
29 Camshaft
30 Cam
31, 31A, 31B Cavity
AA, AB Intake air
F Fuel
f1 Normal injection
f2 Additional injection
S Swirl
T Reverse tumble
α, αA, αB Injection hole angle

The invention claimed is:

1. An internal combustion engine with a piston reciprocating in a cylinder and a combustion chamber defined between the top of the piston and an inner surface of a cylinder head portion of the cylinder, the internal combustion engine enabling compression auto-ignition combustion over a partial area of operating ranges, the internal combustion engine comprising:
a fuel injector for the combustion chamber;
at least one exhaust valve for the combustion chamber;
at least one first intake valve and at least one second intake valve for the combustion chamber; and
a mechanism configured to make adjustment that a valve lift of the first intake valve is greater than a valve lift of the second intake valve;
wherein the piston has a cavity extending inwardly from a top of the piston,
wherein the cavity provides a greater cavity volume on a side of the first intake valve than a cavity volume on a side of the second intake valve, and
wherein the fuel injector is configured to spray fuel into the cavity.

2. The engine according to claim 1, wherein the fuel injector is configured to spray fuel asymmetrically in a manner to create within the combustion chamber an imbalance in spray mass distribution of fuel so that the fuel is sprayed more in volume towards the side of the first intake valve than towards the side of the second intake valve.

3. The engine according to claim 1, wherein the fuel injector includes a plurality of spray holes, and a number of the spray holes corresponding to the side of the first intake valve is larger than a number of the spray holes corresponding to the side of the second intake valve.

4. The engine according to claim 1, wherein the fuel injector has an imbalanced distribution in injection hole angle, with an injection hole angle for the side of the first intake valve side larger than an injection hole angle for the side of the second intake valve side.

5. The engine according to claim 1, wherein the fuel injector is configured to perform a normal injection at a timing during the intake stroke, and then perform an additional injection at a timing during a second half of the compression stroke.

* * * * *